United States Patent [19]

Thompson

[11] 4,183,116
[45] Jan. 15, 1980

[54] WET-DRY VACUUM SWEEPER

[76] Inventor: David L. Thompson, 2019 Wardlow Rd., Long Beach, Calif. 90801

[21] Appl. No.: 898,836

[22] Filed: Apr. 21, 1978

[51] Int. Cl.² .............................................. B01D 50/00
[52] U.S. Cl. ...................................... 15/353; 15/340; 55/314; 55/324; 55/467
[58] Field of Search ................... 15/340, 353; 55/312, 55/313, 314, 324, 467, 328

[56] References Cited

U.S. PATENT DOCUMENTS

| 3,842,461 | 10/1974 | Wurster | 15/353 X |
| 3,870,489 | 3/1975 | Shaddock | 15/353 X |
| 3,973,935 | 8/1976 | Moore, Jr. | 55/314 X |
| 4,062,085 | 12/1977 | Duncan | 15/353 X |

Primary Examiner—Christopher K. Moore
Attorney, Agent, or Firm—Fulwider, Patton, Rieber, Lee & Utecht

[57] ABSTRACT

There is disclosed a wet-dry vacuum sweeper including a waste receptacle mounting a separator for receipt of air and entrained solids from a sweeper head for separation of the larger solids by centrifugal separation and passage of the exhaust flow directly to atmosphere or, at the selection of the operator, through a filtration system including upstanding tubular filters for further filtration of smaller particles from the flow stream.

10 Claims, 5 Drawing Figures

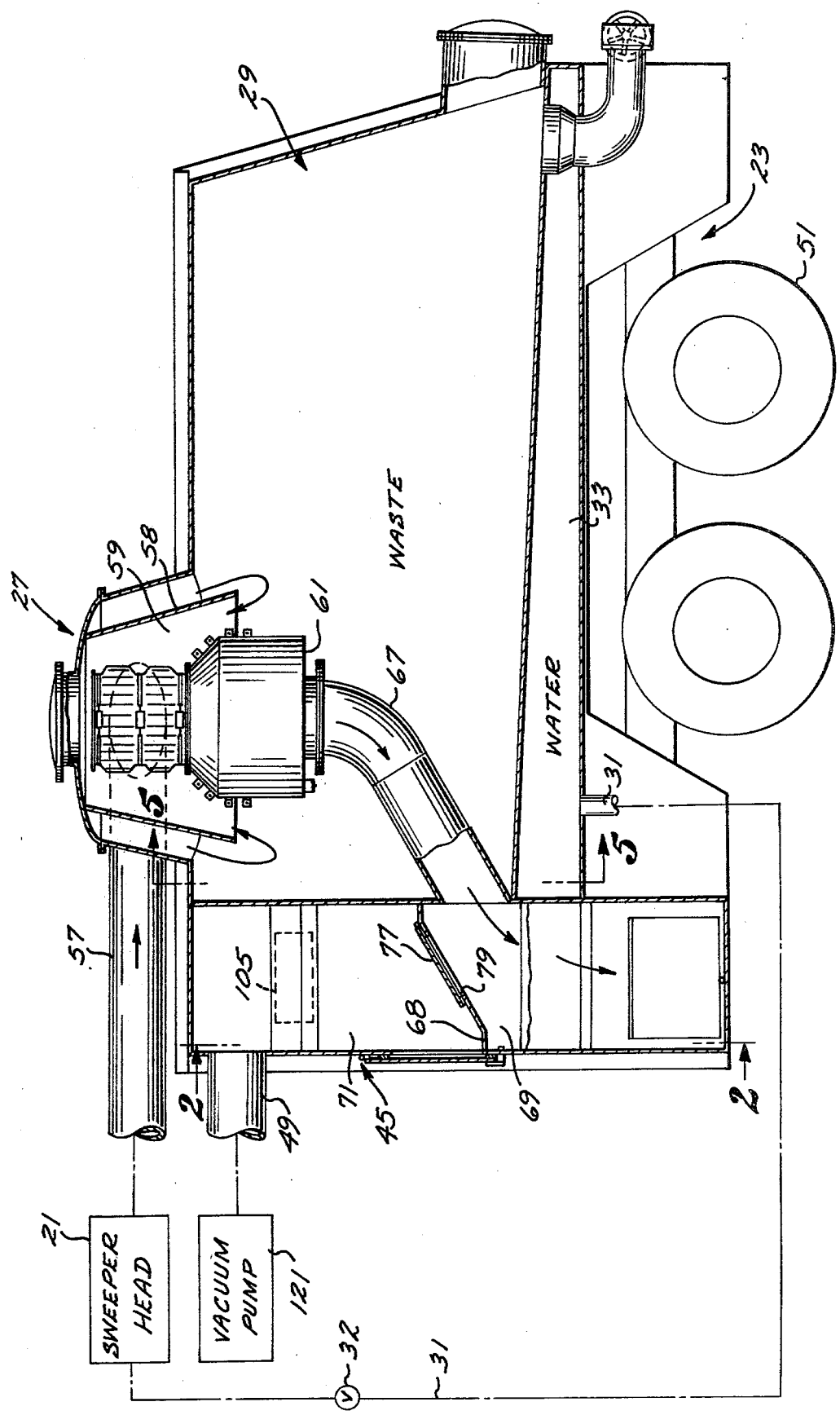

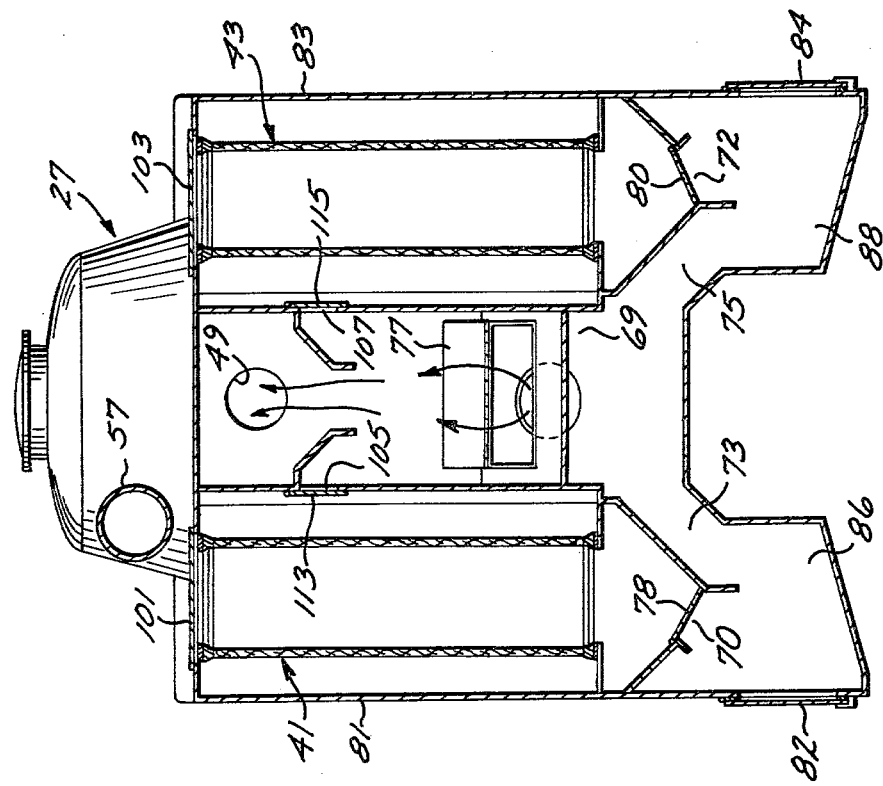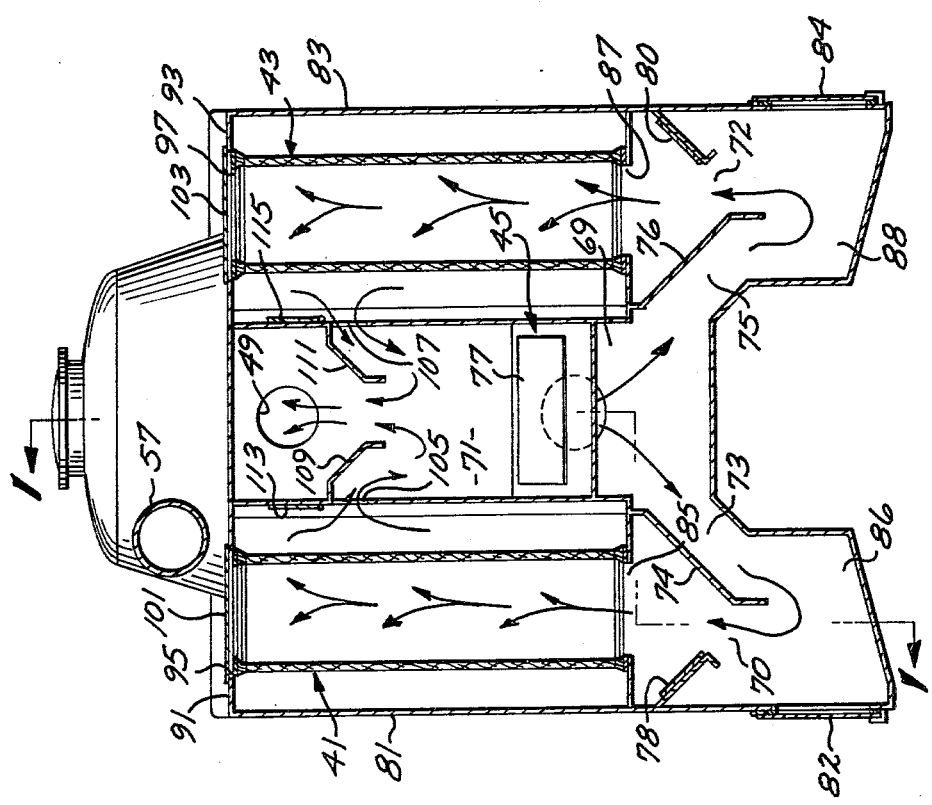

WET-DRY VACUUM SWEEPER

BACKGROUND OF THE INVENTION

1. Field of the Invention:

The wet-dry sweeper of the present invention relates to a device for passing over pavement docks, runways or the like for cleaning thereof to meet, for instance, air pollution control requirements.

2. Description of the Prior Art:

With the advent of present day pollution control restrictions, many efforts have been made to provide for rapid economical cleaning of minute particles from various work areas and surfaces over which various vehicles pass. Heretofore, various types of vacuum sweepers have been proposed which merely vacuum debris from a surface for deposit in a vacuum bag which is not unlike an oversized bag incorporated in a domestic vacuum cleaner. Such prior art devices suffer the shortcoming that replacement of such vacuum bags is prohibitively expensive and many such sweepers lack versatility in being operable in both wet and dry modes and in that their capability of cleaning the entrained solids from the flow stream is extremely limited.

SUMMARY OF THE INVENTION

The wet-dry vacuum sweeper of the present invention is characterized by flow ducts leading from a separator and incorporating valving for selectively directing the exhausted flow stream either to atmosphere or through a filtration system including tubular filters providing for separation of finer entrained solids from the flow stream.

The objects and advantages of the present invention will become apparent from a consideration of the following detailed description when taken in conjunction with the accompanying drawings.

Brief Description of the Drawings

FIG. 1 is a longitudinal sectional view of a wet-dry vacuum sweeper embodying the present invention;

FIG. 2 is a vertical sectional view taken along the line 2—2 of FIG. 1;

FIG. 3 is a transverse sectional view similar to FIG. 2 but showing the system in its wet mode;

DESCRIPTION OF THE PREFERRED EMBODIMENT

Figure 5:
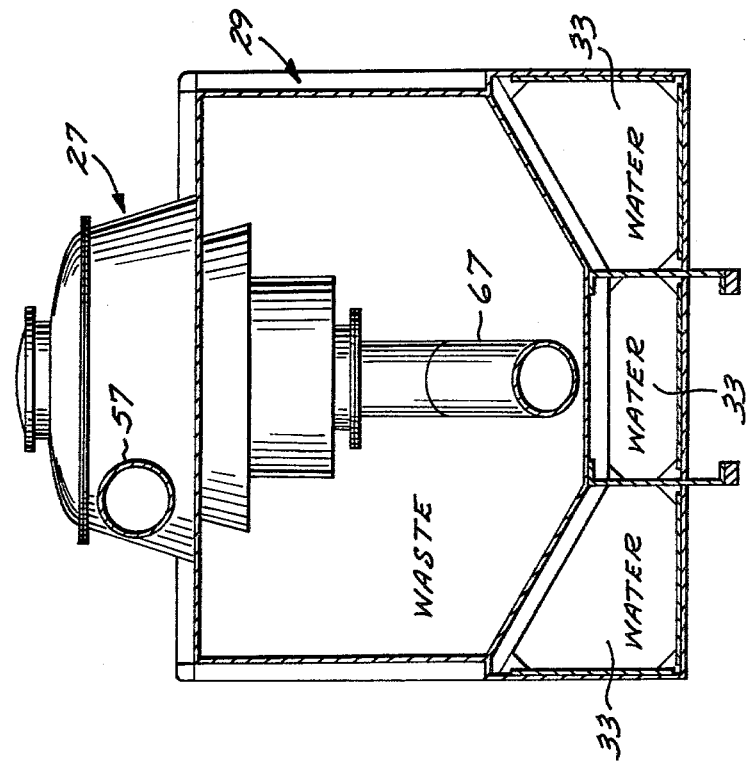
FIG. 5 is a transverse sectional view taken along the lines 5—5 of FIG. 1.

There is disclosed a wet and dry vacuum sweeper including a sweeper head 21 carried from the front of a truck chassis 23 for directing air carried debris into a separator 27 mounted in the upper portion of a waste receptacle 29. A water conduit 31 is connected between a water storage tank 33 and the sweeper head 21 to provide a wetting agent to such sweeper head. A pair of upstanding cylindrical filter tubes 41 and 43 (FIG. 2) are mounted on opposite sides of the waste receptacle tank 29 and have their bottom ends connected with the exhaust outlet of the separator 27 by means of filter ducting, generally designated 45, such ducting including a valving arrangement for selectively directing the separator exhaust to a discharge duct 49 (FIG. 3).

The chassis 23 may be in the form of a truck chassis carried on wheels 51 and the sweeper head 21 and separator 27 may be in the form disclosed in my U.S. Pat. No. 3,959,010. The separator 27 has its inlet connected with the sweeper head 21 by means of a sweeper head conduit 57 (FIG. 4) and provides for reverse flow around the bottom end of a shroud 58 and into the inlet 59 of such separator to separate larger solids from the incoming air to drop into the waste receptacle 29. The debris outlet 61 (FIG. 1) of such separator also opens downwardly into the waste receptacle 29 and the outlet of such separator is connected with a lower plenum chamber 69 by means of a separator outlet conduit 67. The plenum chamber 69 is formed on its top side with a transverse wall 68 having a rectangular filter bypass opening therein which opens into an upper plenum chamber 71 and is normally covered by a valve flap 77.

Referring to FIG. 2, the lower plenum chamber 69 opens downwardly on its opposite sides into filter inlet ducts 73 and 75 having their outside walls defined by angular dropout baffles 74 and 76 to provide for reverse flow upwardly through respective filter inlets 70 and 72 and into the bottom of the respective filters 41 and 43. Settling chambers 86 and 88 are formed below such dropout baffles and have clean-out doors 82 and 84 in the outer walls thereof for opening to remove waste settled in such chambers.

Still referring to FIG. 2, upstanding transversely spaced apart filter chambers 81 and 83 are formed on opposite sides of the plenum chambers 69 and 71 and are formed in their bottom walls with respective circular filter inlet openings 85 and 87 over which the respective filters 41 and 43 rest. The top walls 91 and 93 of the filter chambers 81 and 83 are formed with respective filter removal openings 95 and 97 with telescoping outwardly therethrough of the filters 41 and 43, such openings 95 and 97 being normally covered by filter covers 101 and 103.

Still referring to FIG. 2, the respective interior walls of the filter chambers 81 and 83 are formed with respective filter outlet openings 105 and 107 opening against respective downwardly facing dropout baffles 109 and 111 that provide for reverse flow of discharged air. Respective filter outlet valve flappers 113 and 115 are provided for selective closing of the openings 105 and 107. Referring to FIG. 1, a vacuum pump 121 is connected with the discharge conduit 49 for drawing a vacuum downstream of the separator 27 to draw flow through the walls of the filters 41 and 43 and to draw wet discharge directly from the separator 27 during operation in the wet mode.

It will be appreciated that separator outlet conduit 67, bypass valve 77, upper plenum chamber 69 act as a flow director conduit for selectively directing air from the separator 27 either directly to the discharge conduit 49 or to the filter inlet ducts 73 and 75. Similarly, the upper portion of the upper plenum chamber forms a filter outlet duct leading from the respective filter outlets 105 and 107 to the discharge duct 49.

Figure 4:
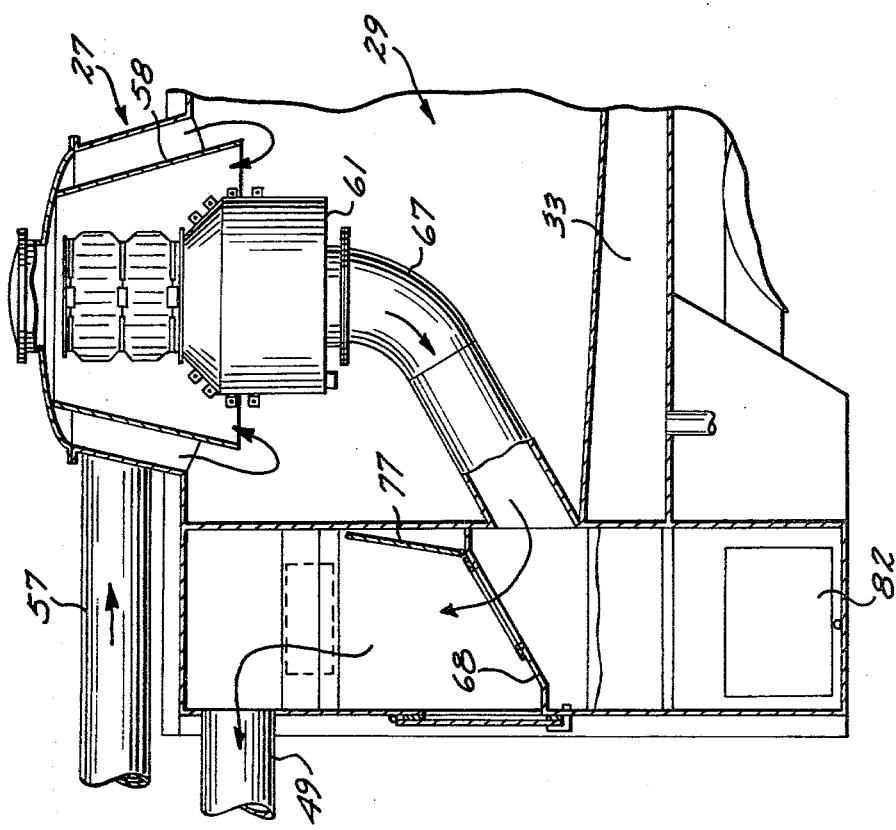
FIG. 4 is a partial vertical sectional view similar to FIG. 1 but showing the vacuum sweeper in its wet mode.

In operation, the engine for the truck chassis 23 is started and the separator 27 engaged and vacuum pump 121 started. When the sweeper is to be utilized in its wet mode, as for instance in picking up wet coal dust or the like, the valve 32 in the wetting agent line 31 may be opened to introduce water from the water tank 33 to the sweeper head 21. The filter inlet valves 78 and 80 and filter outlet valves 113 and 115 are then shifted to their closed position as shown in FIG. 3 and the filter bypass valve 77 opened to direct air and debris discharged from the air outlet of the separator 27 through the conduit 67 and upwardly out through the bypass valve 77, as shown in FIG. 4, for direct introduction into the discharge conduit 49 under the vacuum head provided by the vacuum pump 121. It will be appreciated that the air entrained waste received from the sweeper head 21 is thus separated from the air and deposited into the waste receptacle tank 29. In this mode, the separator 27 will remove entrained solids down to about 10 microns.

When it is desirable to operate the vacuum sweeper in its dry mode, the water supply valve 32 is closed (FIG. 1) and the controls manipulated to close the filter bypass valve 77 and open the filter inlet valves 78 and 80, as well as the filter outlet valves 113 and 115. It will be appreciated that the tubular filters 41 and 43 are easily removable and may be replaced by different styles of filters for different applications. As for instance, for sweeping coke, the filters are typically of woven fiberglas mesh, for sugar, Teflon, and the woven fiberglas or Teflon is typically mounted on rigid tubular perforated metal tubes.

With the sweeper then in its dry mode, the sweeper head 21 will be passed over the surface to be cleaned and the entrained solids will again be introduced to the separator 27 (FIG. 1) where the flow reverses around the dropout shroud 58 and again passes through the separator 27 to be introduced into the lower plenum chamber 69. From the lower plenum chamber the flow is directed around the dropout baffles defining the filter inlet ducts 73 and 75 and then reverses upwardly through the filter inlets 70 and 72 and into the bottom ends of the tubular filters 41 and 43 where flow is directed through the walls thereof. The solids remaining entrained in the flow stream are then filtered down to about one micron in cross section and the flow directed out the outlets 105 and 107 to reverse around the dropout baffles 109 and 111 and be discharged through the discharge duct 49 leading to the vacuum head 121 (FIG. 1). It is important that the filters 41 and 43 be easily removable so that when the solid particles clinging thereto build up to present substantial flow resistance, the covers 101 and 103 may be easily removed and the filters 41 and 43 telescoped out through the outlets 95 and 97 for cleaning and/or replacement of such filters. The filters may be cleaned by merely blowing air in the reverse direction through the walls thereof to back wash such filters for re-use.

From the foregoing, it will be apparent that the wet-dry vacuum sweeper of the present invention provides an economic and effective means for sweeping pavement docks, runways and the like to meet the stringent air pollution control requirements now common in various local, state and Federal government regulations. Further, such sweeper has tremendous versatility in filtering to various filtration levels and being capable of operating at relatively high speeds for rapid cleaning of the surface over which it passes.

Various modifications and changes may be made with regard to the foregoing detailed description without departing from the spirit of the invention.

I claim:

1. A filtered vacuum sweeper comprising:
   a frame;
   wheels for carrying said frame from a surface to be swept;
   a sweeper head carried from said frame for passing over said surface;
   a separator mounted on said frame and including an inlet and discharge outlet;
   vacuum means for aspirating air and waste from said head to said separator;
   a duct connected between said head and the inlet to said separator;
   a filter chamber including spaced apart oppositely disposed end walls and side walls, an inlet formed in one of said end walls, a filter removal opening formed in the opposite end wall and an outlet formed in one of said side walls;
   a rigid walled tubular filter having one end surrounding said filter inlet and projecting therefrom to abut its opposite end against the opposite end wall;
   a separate outlet conduit leading from said separator discharge outlet to said filter inlet;
   a waste receptacle mounted on said frame for receiving waste from said separator and from the interior of said filter; and
   a removable cover attached to said opposite end wall and removably covering said filter removal opening whereby said sweeper may be moved over said surface and said vacuum means will aspirate waste picked up by said sweeper head to said separator where larger particles of waste will be separated from said air and said air will then be directed through said outlet conduit to said filter inlet, through the wall of said tubular filter and out said filter outlet and when said filter becomes spent said cover may be removed and said filter removed out said removal opening for cleaning.

2. A filtered vacuum sweeper as set forth in claim 1 that includes:
   bypass means in said separate outlet conduit, bypassing said filter, and including valve means operative to selectively direct air into said filter inlet or in bypassing relationship therewith.

3. A filtered vacuum sweeper as set forth in claim 1 that includes:
   a second filter chamber spaced horizontally from said first mentioned chamber and formed with oppositely disposed end walls and side walls, one of said end walls being formed with a second filter inlet, the opposite end wall being formed with a filter removal opening and one of the side walls being formed with a second filter outlet;
   a second rigid hollow tubular filter having one end surrounding said second filter inlet, projecting therefrom to abut its opposite end with said removal opening;
   a second cover converting said second filter removal opening; and
   said separate outlet conduit being interposed between said filter and being in communication with said filter inlets.

4. A wet-dry vacuum sweeper comprising:
   a frame;
   wheels for supporting said frame from the surface to be swept;
   a vacuum sweeper head mounted from said frame for passing over the surface to be swept;
   a wetting agent tank mounted on said frame;
   wetting agent conduit means connected between said tank and said sweeper head for conducting wetting agent to said sweeper head and including valve means for controlling flow of wetting agent to said head;
   a waste receptacle mounted on said frame;

a separator mounted on said frame and including a waste dump opening into said receptacle, said separator further including an inlet and an outlet;

filter means mounted on said frame for filtering debris entrained in air passed therethrough and including a filter inlet and a filter outlet;

a conduit leading from said sweeper head to the inlet of said separator;

discharge means leading from said separator outlet and said filter outlet to atmosphere for discharging separated and/or filtered air to atmosphere;

flow director conduit means leading from the outlet of said separator and branching into a filter inlet duct leading to the inlet of said filter means and a separator discharge duct leading to said discharge means, said flow director means including a bypass valve to selectively direct air from the outlet of said separator to said filter inlet or to said discharge conduit;

a filter outlet duct leading from said filter outlet to said discharge means for passage of air from said filter outlet to said discharge means; and a filter inlet valve in said filter inlet duct and a filter outlet valve in said filter outlet duct and means for controlling, said filter inlet, valve said filter outlet valve and said bypass valve said control means having a wet mode operative to direct filtered air from said separator through said discharge duct to said discharge means and further having a dry mode for directing filtered air from said separator through said filter inlet duct, filter means, filter outlet duct and out said discharge means.

5. A wet-dry vacuum sweeper as set forth in claim 4 that includes:

baffle means in said filter inlet duct for receiving separated air from said separator and reversing flow thereof.

6. A wet-dry vacuum sweeper as set forth in claim 4 that includes:

baffle in said filter outlet duct means for receiving filtered air from said filter means and reversing the direction of flow thereof.

7. A wet-dry vacuum sweeper as set forth in claim 4 wherein:

said filter means includes a filter chamber formed with top, bottom and side walls, said bottom wall being formed with said filter inlet, said inlet being surrounded by a filter support, said top wall being formed with a filter removal opening and said side wall being formed with said outlet, said filter means further including an upright tubular filter screen setting on said support, surrounding said filter inlet and projecting to said removal opening, said filter means further including a filter cover covering said opening and seating against the top of said filter screen.

8. A wet-dry vacuum sweeper as set forth in claim 4 wherein:

said filter means includes a pair of horizontally spaced apart upright filter chambers separated by said filter outlet duct means and being formed with bottom, top and side walls, said bottom walls being formed with respective filter inlets and said side walls being formed with respective filter outlets leading to said outlet duct means, said filter means further including a pair of upstanding tubular filter screens having their bottom ends surrounding said respective inlets and projecting upwardly therefrom to abut said respective top walls on their respective top ends.

9. A wet-dry vacuum sweeper as set forth in claim 4 wherein:

said filter means includes mesh means in the form of a hollow cylinder for passage through the cylindrical wall thereof of debris entrained air for filtration thereof.

10. A wet-dry vacuum sweeper as set forth in claim 4 wherein:

said filter means is in the form of a hollow cylinder having the wall thereof defining a filter and said filter means includes mounting means for removably mounting said hollow cylinder on said frame.

* * * * *